United States Patent [19]
Waterbury

[11] 3,896,266
[45] July 22, 1975

[54] CREDIT AND OTHER SECURITY CARDS AND CARD UTILIZATION SYSTEMS THEREFORE

[76] Inventor: Nelson J. Waterbury, 400 Coconut Row, Palm Beach, Fla. 33480

[22] Filed: June 2, 1972

[21] Appl. No.: 259,248

Related U.S. Application Data

[63] Continuation-in-part of Ser. No. 169,906, Aug. 9, 1971, Pat. No. 3,752,904.

[52] U.S. Cl. ............................................. 179/1 SB
[51] Int. Cl. ............................................. G10l 1/04
[58] Field of Search ............ 179/1 SA, 1 SB, 2 DP; 340/149 R, 149 A, 152; 235/61.7 B

[56] References Cited
UNITED STATES PATENTS

| | | | |
|---|---|---|---|
| 2,416,353 | 2/1947 | Shipman | 179/1 VS |
| 3,412,493 | 11/1968 | French | 235/61.7 B |
| 3,466,394 | 9/1969 | French | 179/1 SB |
| 3,525,811 | 8/1970 | Trice | 179/1 SB |
| 3,559,175 | 1/1971 | Pomeroy | 340/152 R |
| 3,594,727 | 7/1971 | Braun | 340/152 R |
| 3,673,331 | 6/1972 | Hair | 179/1 SB |
| 3,688,088 | 8/1972 | Brown | 235/61.7 B |
| 3,700,815 | 10/1972 | Doddington | 179/1 SA |
| 3,723,655 | 3/1973 | Zucker | 235/61.7 B |
| 3,742,451 | 6/1973 | Graham | 179/1 SB |

*Primary Examiner*—William C. Cooper
*Attorney, Agent, or Firm*—Sherman & Shalloway

[57] ABSTRACT

A security card (which may be a credit card) according to the invention has recorded on it data identifying a personal and non-counterfeitable attribute, such as the voice characteristics, of the authorised holder of the card. A card utilisation system according to the invention provides means for comparing the attribute as recorded by these data with the corresponding attribute of the person wishing to use the card, thereby substantially eliminating the possibility of unauthorised use of the card. The utilisation system, when applied to credit card utilisation, preferably includes document facsimile transmission, whereby, for example, a credit card user obtaining credit remotely can be provided with a facsimile copy of the usual credit sale document, which facsimile copy he signs before transmitting another facsimile copy, this time of the signed first copy, to provide the remote credit issuing location with his authentication of the transaction. Preferably, also, the system includes provision for television communication between credit card holders and the credit-giving locations, whereby, for example, a remote would-be purchaster can be shown goods in which he is interested. The system is also adapted to provide for credit card payment in, for example, pay television distribution systems and for remote purchase of theatre and airline tickets and of services such as the supply of information from computerised information systems and computerised translation services. Individual human voices embody characteristics which are unique and identifiable. A credit card can, therefore, be equipped with a voiceprint-cipher, which can be used to corroborate authorised possession by the card-holder. Contour-lines or numerically coded representations can be used to embody the voice-print information on the credit card, and electronic comparators can be used for automatic verification of identity. The voice cipher can be combined with a charge account code cipher, to provide further protection of the integrity of a credit card.

16 Claims, 14 Drawing Figures

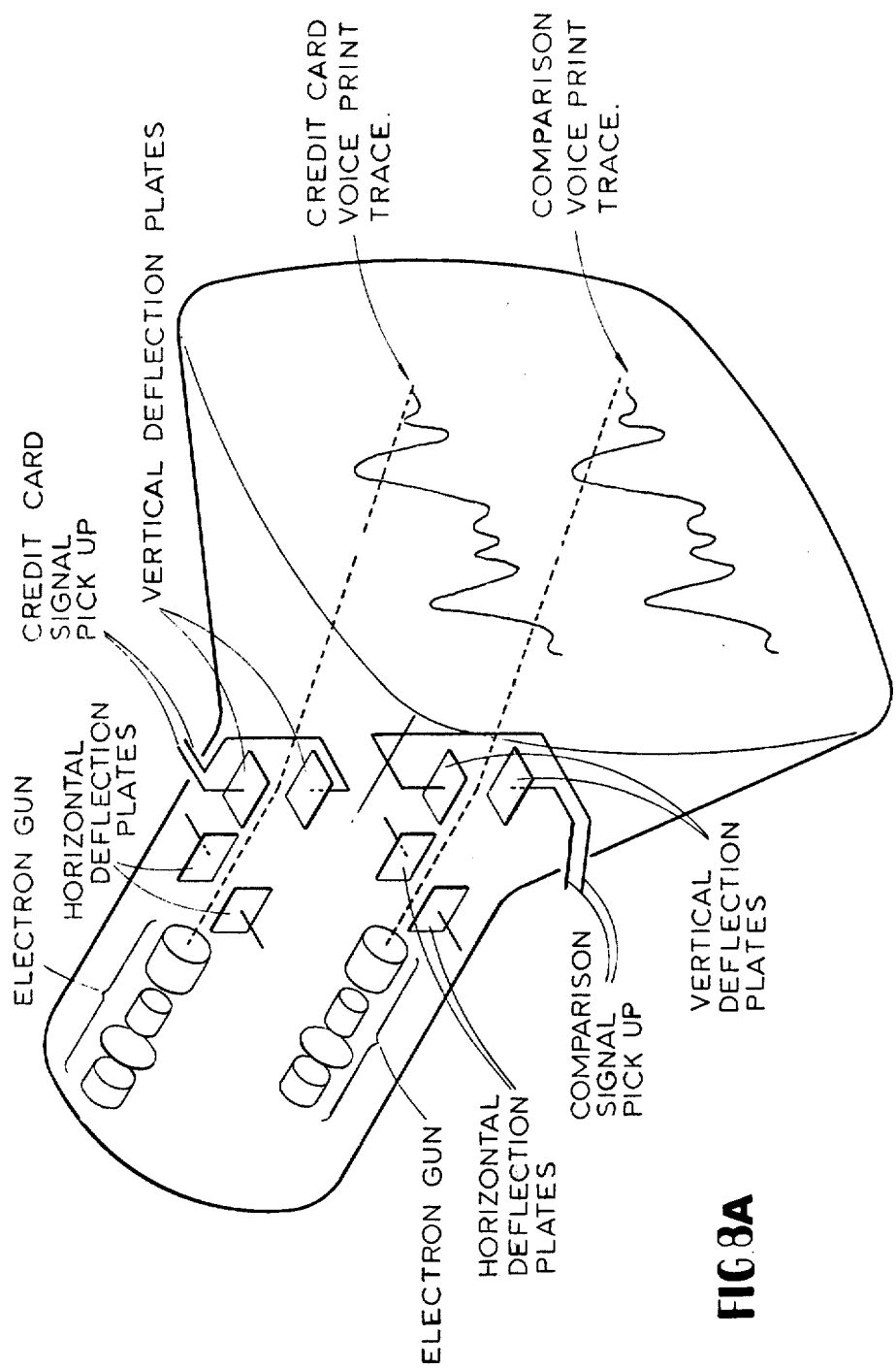

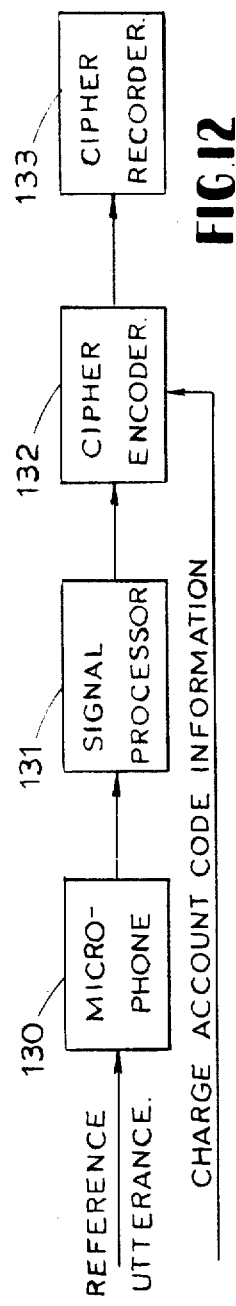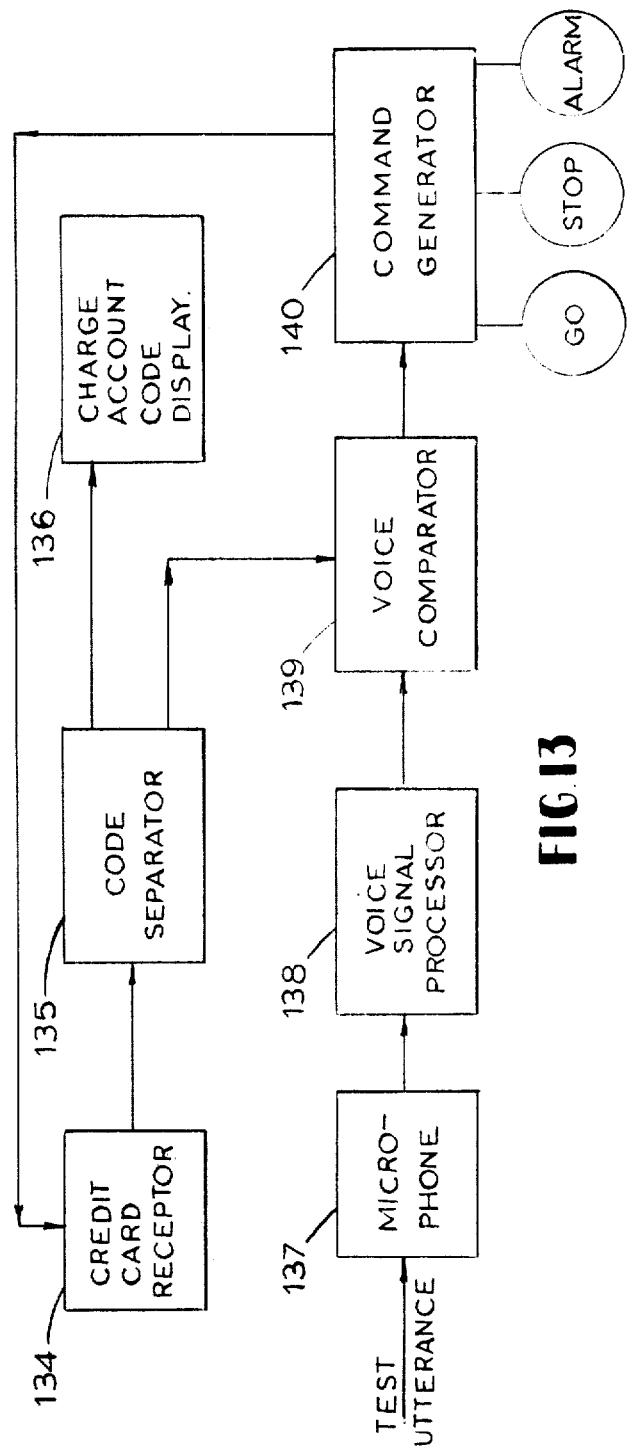

CREDIT AND OTHER SECURITY CARDS AND CARD UTILIZATION SYSTEMS THEREFORE

This is a continuation-in-part of U.S. patent application Ser. No. 169,906, filed Aug. 9, 1971 now U.S. Pat. No. 3,752,904.

BACKGROUND OF THE INVENTION

1. FIELD OF THE INVENTION

This invention relates generally to the verification of personal cards identifiable with individual persons, hereinafter referred to generally as "security cards". Security cards include inter alia cards issued in connection with particular credit systems and referred to herein as "credit cards". The invention is generally concerned with credit and other security cards and with utilisation systems for such cards. Use is made of an uncounterfeitable attribute of the card holder such as his voice characteristics. The invention therefore relies inter alia on automatic speech analysis, voice feature extraction and feature comparison systems and methods. In a major aspect, the invention is concerned more particularly but not exclusively, with a system and a method for the verification of a credit card by comparing features of the card-holder's voice with an utterance-cipher recorded on the credit card.

2. DESCRIPTION OF THE PRIOR ART

Fraudulent use of credit cards by unauthorised persons annually causes substantial financial loss and inconvenience to companies as well as to the individuals whose cards may be lost or stolen. There are many and elaborate kinds of fraud, and most of these are subject to the ability of the impostor to pass as the authorised owner of the card. Conventionally, verification of ownership is based on the card-holder's signature. This signature is, of course, visible to an impostor. Although an expert would be capable of spotting a forged signature without much difficulty, the average person, e.g. the shop assistant or the petrol station attendant, would not be likely to detect a forged signature. Automatic feature comparison for machine-verification of a validation signature presents considerable technical obstacles, and is not regarded as a practical proposition.

Verification by methods less subject to impersonation of forging, and more suitable for automatic verification by means of a machine, is therefore desirable. A number of techniques exist which facilitate the embodiment of a system and method to achieve this aim. These are described in the following paragraphs.

Systems have been proposed for Automatic Talker Identification, whereby features are extracted from the uttered speech of a person and used for verification of this speaker's identity.

L. G. Kersta has described in the journal: Nature a method of Voiceprint Identification by which people can be identified from a spectrographic examination of their vocal utterances Ref. 1 L. G. Kersta — "Voiceprint Identification" — Nature, No. 4861 (Dec. 29th, 1962), pp 1253–1257. Kersta used two types of "Voice-print", one for the subjective determination of speaker identity and the other for the automated classification of known speakers. Voice prints are thus seen to be graphic representations of certain characteristic properties of speech or speech segments, uttered by an individual. These voice prints are produced by means of acoustic analysis instruments such as a sound spectrograph, which has the capacity to translate speech sounds into a visual representation of these sounds. A voice print as described by Kersta exhibits physical dimensions which include "time", "frequency" and "loudness". These can be represented in terms of (i) the position along the horizontal axis; (ii) the position along the vertical axis; and (iii) the density of the printed pattern, respectively. The information in the third dimension (loudness) can be represented by means of contour lines instead of by a density pattern. The method described by Kersta is based on the observation that certain features, recognisable in such a voiceprint, are specifically characteristic of an individual, and are not shared with other speakers, even if their voices seem very similar to the unaided listener.

Attempts to disguise the voice, e.g. by whispering or by the speaker holding his nose, do not alter the basic features in a person's voiceprint, and it is believed that each voice is uniquely different. Voices are therefore identifiable with the kind of accuracy that fingerprint identification offers. The cause of this uniqueness is the mechanism of speech relative to the physical properties of the individual's vocal tract. The parts which principally determine uniqueness are the vocal cavities and the articulators. The major cavities affecting speech are the throat, and the nasal and oral cavities. The contribution of the vocal cavities to voice uniqueness lies in their size and the manner in which they are coupled together. The likelihood of two people having all their vocal cavities of the same size and coupled identically is remote. A still greater factor in determining voice uniqueness is the way in which the articulators are operated during speech. The articulators include the lips, teeth, tongue, soft palate and jaw muscles, whose controlled dynamic interplay results in intelligible speech.

The underlying principle of pattern classification used in automated speaker verification is the pre-specification of a set of classes of events or features between which distinguishing characteristics are desired. The following system has been proposed for verification of these voice characteristics. An input is derived from a microphone which feeds into a spectrum analyser. There are many types of spectrum analyser ranging from a channel filter bank which gives spectral information at discrete frequency locations to those which give an accurate harmonic frequency analysis. Real-time analysers are also available. These are heterodyne analysers in which repeated scans are made while signal components are shifted across a fixed band-pass filter. The analysis filter band-width in the voiceprint application is broader than the highest pitch frequency expected, thus giving directly a good approximation of the signal envelope averaged over the effective time constant of the analysing filter.

Another method involves converting the continuously shaded amplitude scale of a voiceprint such as that described by Kersta (loc.cit.) to a quantized scale which may use 3-bit quantization over a 48 dB amplitude range or a higher bit rate for a more sensitive measure of spectral shapes. The quantized measurements can then be used as input data for the feature extraction and subsequent identification process, including computerized pattern matching.

Speaker recognition involves the extraction and recognition of speech features which are unique to the speaker. Two types of speaker recognition should be distinguished from each other:

(i) Speaker Identification

This is the determination of the identity of a speaker from one or more utterances of cue words, but without a voluntary disclosure of identity.

(ii) Speaker Verification

This is the determination of whether a speaker truthfully identifies himself on the basis of both the cue words and a clue to the identity (or purported identity) of the speaker.

Both the identification and the verification processes employ a comparison of encoded features extracted from cue words with a pre-established speech or code reference. The two processes differ in the manner in which the comparison is made. In the case of speaker identification, it is necessary to compare codes derived from the cue words with all the entries in the speaker code file. This procedure, called the non-cooperative search mode can be used in law enforcement applications. Speaker verification requires that codes derived from cue-words should be compared with only those pre-stored codes corresponding to the purported identity supplied by a speaker who wishes to be identified. This process is called the cooperative search mode. It may be used, for example in a time-share computer system when a user wishes to gain access to proprietary files.

Speech signals contains information describing the word spoken as well as the identity of the speaker. If the identical word is spoken by different speakers, the differences between speakers can be identified more easily; hence, the use of key words, particularly in speaker verification systems. The differences in utterance characteristics which allow the recognition process to become effective can be understood by consideration of the voiceprint described by Kersta (loc. cit.). Here, the spectrogram of a brief utterance, e.g. a single word or even just one syllable, is analysed in the frequency-time domain. The spectrogram is divided into grids using small increments of time and small increments of frequency. Thus, a weighted frequency spectrum can be correlated for each utterance segment. Typically the utterance of a short word may be segmented into ten or more segments along the time axis. Each of the utterance segments will, in turn, be examined for its energy distribution along the frequency axis. The resulting pattern which can be mapped or digitized, will be typical, and different, for different speakers, even when the same word is spoken by them.

Different codes and different forms of measurement can be used to distinguish different speakers. James E. Luck has described in The Journal of the Acoustical Society of America cepstral measurements for automatic speech verification Ref. 2 James E. Luck — "Automatic Speaker Verification Using Cepstral Measurements" — Journal Acoust. Society America, Volume 46, Number 4, Part 2 (1969), pp. 1026 - 1032. His automatic speaker-verification system is well suited to demonstrate the uniqueness of voice characteristics. It analyses a specific part of a standard test phrase and takes a few seconds to decide whether the speaker is the person he claims to be or is an impostor. In the context of the instant invention, the particular interest of this work by James E. Luck (Ref. 2) relates to: (i) the set of measurements he proposes for distinguishing between speakers; (ii) the reference data required to characterise the normal variations in a speaker's voice; and (iii) the verification accuracy obtainable. Speech data for the Luck system are (a) taken from a microphone; (b) bank-limited; (c) analog-to-digital converted; and (d) stored in a computer memory. The frequency range up to 3 kHz, over which filter gain is virtually flat, is adequate for the recognition process. This feature is significant since recognition over a normal telephone link is often desirable. Storage locations for 8,000 samples of the speech signal are reserved in the computer memory. Thus, at an 8 kHz sampling rate, up to 1 sec of data may be stored at any one time. When a speaker wishes to have his identity verified, he supplies his purported identity to the computer via the teletype. The available reference data for that speaker are then read into the computer from a memory disc on which they have been previously recorded. The speaker then utters the test phrase for analysis and for comparison with the data read off the disc. The criteria used for comparison can be mathematically expressed as vectors in a multi-dimensional vector space having between 16 and 34 dimensions in the exercise described. Measurement vectors derived from the uttered phrase are compared with reference vectors derived from the disc memory. The euclidian distance between the test vector and the reference vectors is computed. If the distance between the test vector and the closest reference vector is less than, or equal to, a predetermined threshold, the speaker of the test phrase is verified as being the same person as the speaker of the reference samples. Thus, the location of the reference vectors and the threshold level determine a piecewise quadratic boundary that defines the reference-speaker region of the measurement space. Optimum settings of the decision thresholds are then established so that there is an adequate working region within which only impostors are rejected and only the authorised speaker is accepted. Obtaining an adquate set of reference data is conditional upon the effectiveness of the verification system. It is significant that, while an impostor is unlikely to gain acceptance by mimicry, it is a trivial matter for the reference speaker to alter his voice if he wishes to be identified as an impostor. This is an important feature of the verification system, not expected in identification systems where it would be highly undesirable. It is a feature which allows relatively simple verification systems to be devised.

Various pattern matching procedures have been specifically proposed for the comparison of reference samples of speech sounds with test samples for verification. S. Pruzansky Ref. 3 Sandra Pruzansky — "Pattern Matching Procedure for Automatic Talker Recognition" — Journal Acous. Society America, Volume 35, Number 3, (1963) pp 354 - 358, described the automatic recognition of such speech sounds based only on acoustic information. If the same word is spoken by different speakers, automatic speaker recognition by spectral pattern matching provides a means for identification of a given speaker. Spectral analysis was accomplished by playing back the recordings through a 16 channel filter bank and a special 17th channel which band passed frequencies of from 5 to 7 kHz. The other filters covered the range of from 200 to 4,000 Hz. The output of the filter bank was sampled sequentially by a multiplexer at a rate of 100 samples per second. The samples were quantized into 10 bit binary numbers which were recorded on digital tape. The procedure used for the recognition of talkers consisted in cross-correlating the single utterances of each word with reference patterns. The talkers' utterances were used to form reference patterns. The results of experiments are given for time-frequency-energy patters (three-dimensional) and for two-dimensional patterns illuminating the temporal information. The original three-dimensional patterns were reduced to energy-frequency arrays containing 17 array points, each point being simply the sum of energy from each of the time sections for that frequency band. With the time dimension eliminated, talkers were corectly recognised for a high percentage of the utterances tested. The long-time frequency spectra of the voices were also investigated, and a reference pattern for each talker was formed by summing up the energy of the voiced speech across a number of different utterances by the same speaker. This considerably reduced the number of patterns to be recognised.

A sophisticated approach has been proposed by Li, Dammann and Chapman Ref. 4. K. P. Li, J. E. Dammann and W. D. Chapman — "Experimental Studies in Speaker Verification, Using an Adaptive System" — Journal of the Acoustical Society of America, Vol. 40, No. 5 (1966) pp. 966 – 978, using a two-level, adaptive linear threshold element (L.T.E.) system to perform speaker discriminations, and in particular utterance verification of an expected speaker. Feature extraction and comparison are described including the use of bank pass filters, feature detection, digitizing and decision circuitry.

The present invention is based on the appreciation that the characteristics of the human voice which constitute an uncounterfeitable attribute of each individual person, that these techniques can be used to provide systems for recognition or verification of security cards such as credit cards. The invention makes use of the voiceprint and other identification techniques which rely on the recording and analysis of voice characteristics.

In one aspect of the invention, instead of, or in addition to, the signature carried on the credit card, and which has to be reproduced by the user as proof of his identity, the card bears a cipher representing the recorded utterances of a reference phrase, and embodying features characteristic of the user's voice. The authorised user's voice is the means whereby he identifies himself, its characteristic and unique features being automatically compared with the verification cipher on the card.

The invention further relates to a device for use with a security card, such as a credit card, of the kind referred to above, namely a card which carries a record of a voiceprint of the authorised holder of the card, the record being in a form such that it can be "read" by suitably transducer means to reproduce the voiceprint in a form in which it can be compared with a voiceprint derived directly from the voice of a person presenting the card to thereby authenticate that person's identity if he is in fact the authorised holder but not otherwise.

According to another aspect of the invention, there is provided a device which will derive a first voiceprint from the voiceprint record on such a card, and will also derive a second voiceprint from the voice of a person speaking to it, and will further compare the first and second voiceprints and give an indication that they are, or are not, voiceprints of one and the same voice.

There are a variety of forms in which such a device can be provided. In one form, the device includes a card transport system.

Instead of, or additional to, a magnetically recorded voice print, the card may bear a visible representation of the voiceprint, and the device according to the invention may incorporate a television-type camera for scanning the voiceprint (and, if desired, other visibly coded information), and providing an electrical signal train representative thereof for comparison with the voiceprint derived directly by means of the microphone.

One situation in which the device according to the invention is useful is at a point of sale, such as the counter of a store, bank, airline ticket office or off-track betting office, where there is personal contact with someone who has to be convinced of the card holder's identity but will thereafter deal personally with the holder and his card.

A device according to the invention may also, however, be used to enable the card holder to obtain credit remotely. For example, such a device may be provided beside a coin-operated telephone, as a means of making telephone calls with a credit card instead of cash payment. The device may for example be connected to the telephone control circuitry and, over the telephone circuits, to the telephone company's accounts department. On presentation to the device of a credit card bearing a voiceprint, and of a speech sample by the user, the device makes a comparison of the voiceprints as described above and, if the comparison proves satisfactory, feeds to the telephone control circuitry a signal rendering the telephone operative for use (as though coins had been inserted). The device is arranged to feed, over the telephone circuits to the company's accounts department, either the voiceprint or other identifying information read from the card, whereby the card user's telephone account is identified and the telephone call made thereafter by the card user is charged, preferably automatically, to his account as thus identified.

Objects of the invention include the provision of increased security against misuse of a credit or other security card according to the invention, such for example as a personal identity pass, and simultaneously without sacrificing this increased security, widened facilities for authorised use of the card, including its use to authenticate the user's identity or to obtain credit at a location remote from that of the card holder, and even on a world-wide basis by making use of an existing or a specially provided international telecommuncations network. Other objections and features of the invention will also become apparent from the following disclosure of the invention.

The basic feature of the invention is the provision of a security card which bears, as data identifying the authorised holder, data relating to characteristics or an attribute which are so personal to the holder, that he, and only he, can use these characteristics or such personal attributes to generate, in a signal transmission system, signals which are transmissible by the transmission system to a remote location and which can then be compared with signals which are generated by means of the identifying data recorded on the card.

The invention, as will be understood, is a system and method for receiving the card holder's utterance of a reference phrase; deriving from this utterance a cipher or voiceprint which can, in suitable form be embodied in the credit card; receiving the credit card at the verification point; deriving a reference signal from the cipher or voiceprint; receiving the utterance of the test phrase spoken by the user at the verification point; effecting a temporary recording of this utterance and/or processing the utterance to derive a test signal therefrom; comparing the test signal with the reference signal according to certain criteria so that the authorised user's utterance is accepted whereas an impostor's utterance is rejected; and producing output command functions depending on the result of the comparison, i.e. on the verification or rejection of the claim to authorised use of the card.

Another object of the invention is the use of the disclosed system and method for verification of caller identity in telephone call boxes equipped for voiceprint or cipher comparison, for the purpose of payment for telephone calls, cables, seat reservations, flight bookings, off-course betting, and so on.

Another use concerns identity cards for purposes other than payment, e.g. military use, admission to clubs and so on.

A further use concerns the automatic recording of the impostor's voice as part of the process which, in addition to providing an effective deterrent, can be instrumental to his identification and capture. This feature may well increase the use of credit cards by removing the fear that a credit card lost or stolen should become an easy prey to the petty criminal. It must be remembered that the signature on an ordinary credit card is clearly visible and forgery is not easily spotted by the sales assistant or petrol vendor, for example, because the impostor has an easy opportunity for practising the signature before attempting the fraud. A voiceprint is not vulnerable in this way. In contrast to a written signature, the recorded voice cipher is not readable, and cannot be used without special equipment. Even with the aid of special de-ciphering apparatus, successful voice imitation is virtually impossible, as unlike handwriting, the voice-print is not amenable to simulation.

It is therefore possible to use the invention in combination with, and to protect from fraud and forgery, such documents as stock certificates, passports, travellers cheques and social security cards which may also be used for voter registration as means of identification at the polling booth.

DESCRIPTION OF THE INVENTION

Recognition or verification of authorised ownership of a credit card or other security card is the main objective of the present invention. Such verification is made possible for the rightful owner by for example comparing and identifying features of his voice with the voiceprint contained on the credit card or other document which bears a voiceprint reference cipher.

The verification equipment normally takes the form of a small box with a microphone in a convenient position. The box has a slot into which the credit card can be inserted. Indicators which may take the form of a green and red indicator light, are visibly placed on the box to initiate command functions, i.e. to indicate the completion and the verdict of the verification process. For applications where the credit card verification equipment is used in connection with automatic petrol pumps, telephone credit, automatic money dispensing or other unattended vending operations, an alarm is provided by way of command function, to call remote personnel to take action when an impostor tries to use someone else's credit card, and when this is detected by the voiceprint comparator.

These and other features of the invention will be disclosed in the following description of embodiments of the invention, with reference to the accompanying drawings in which.

Figure 5:
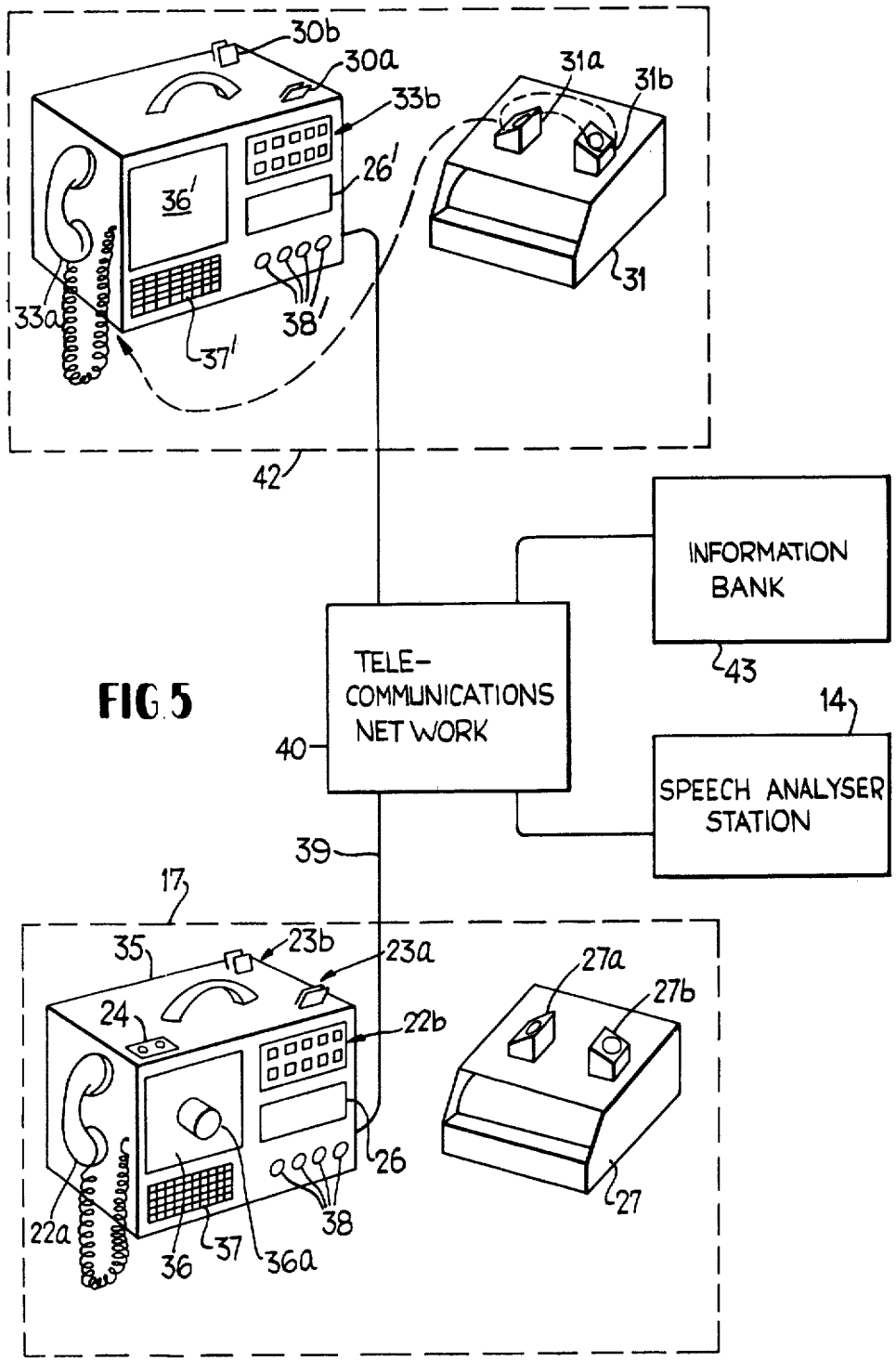
Figure 6:
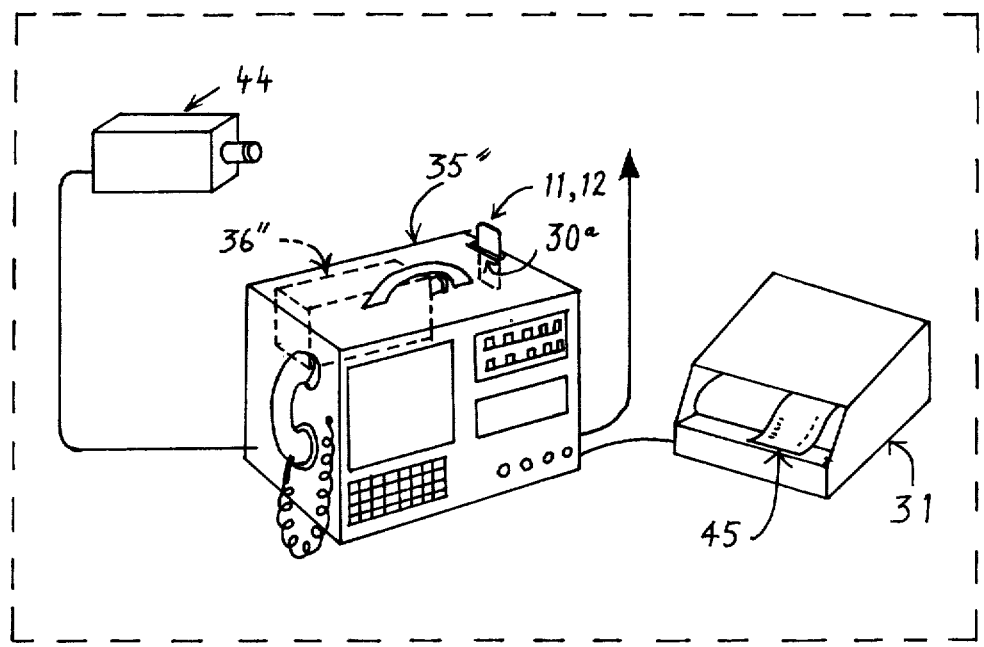
Figure 7:
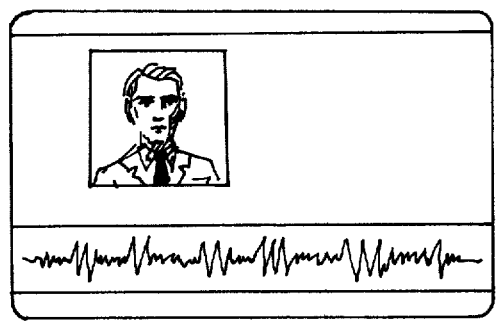
Figure 8:
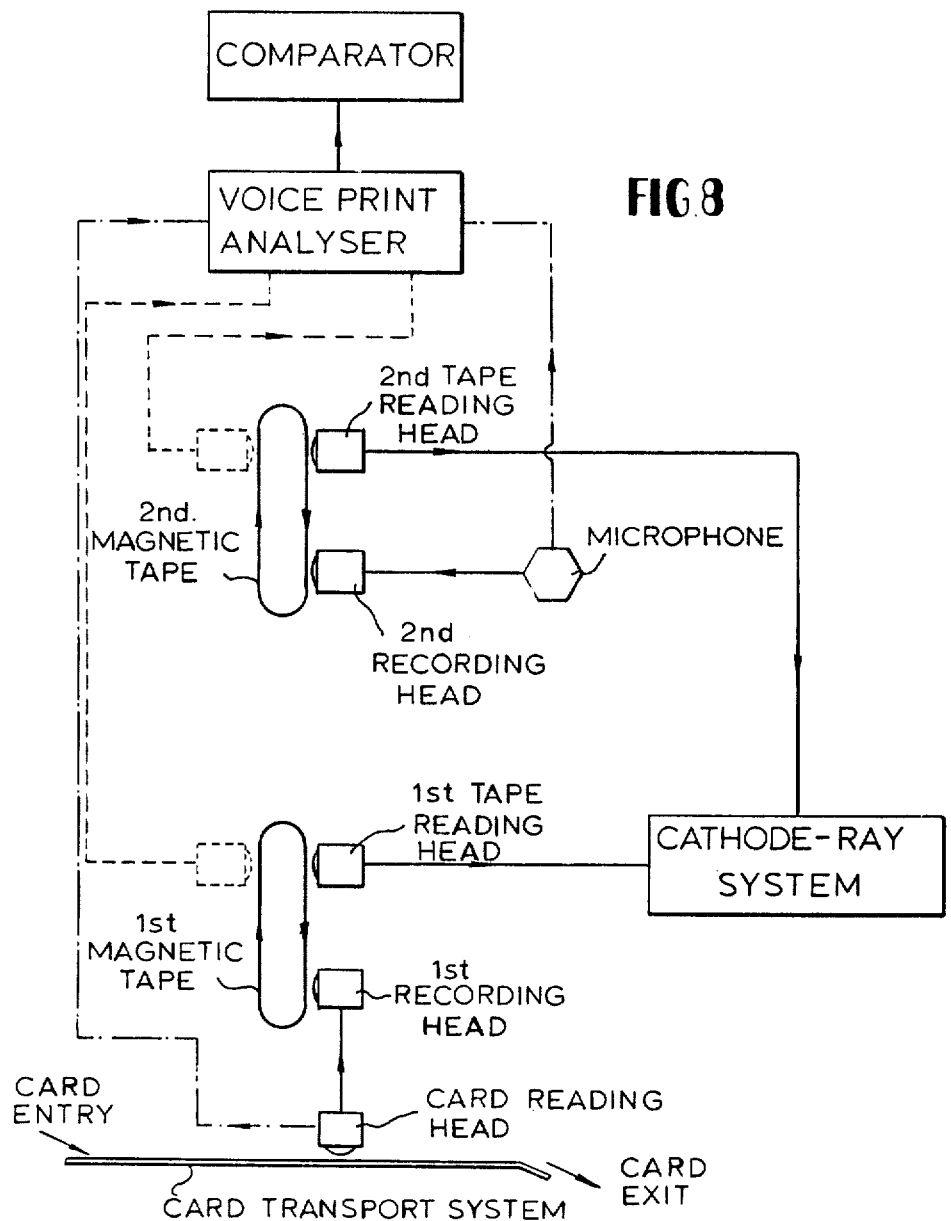

FIG. 5 schematically illustrates a further embodiment of a security card utilisation system according to the invention;

FIGS. 6 and 7 show further modifications;

FIG. 8 is a highly schematic diagram of a card verification system which includes a card transport system.

Figure 9:
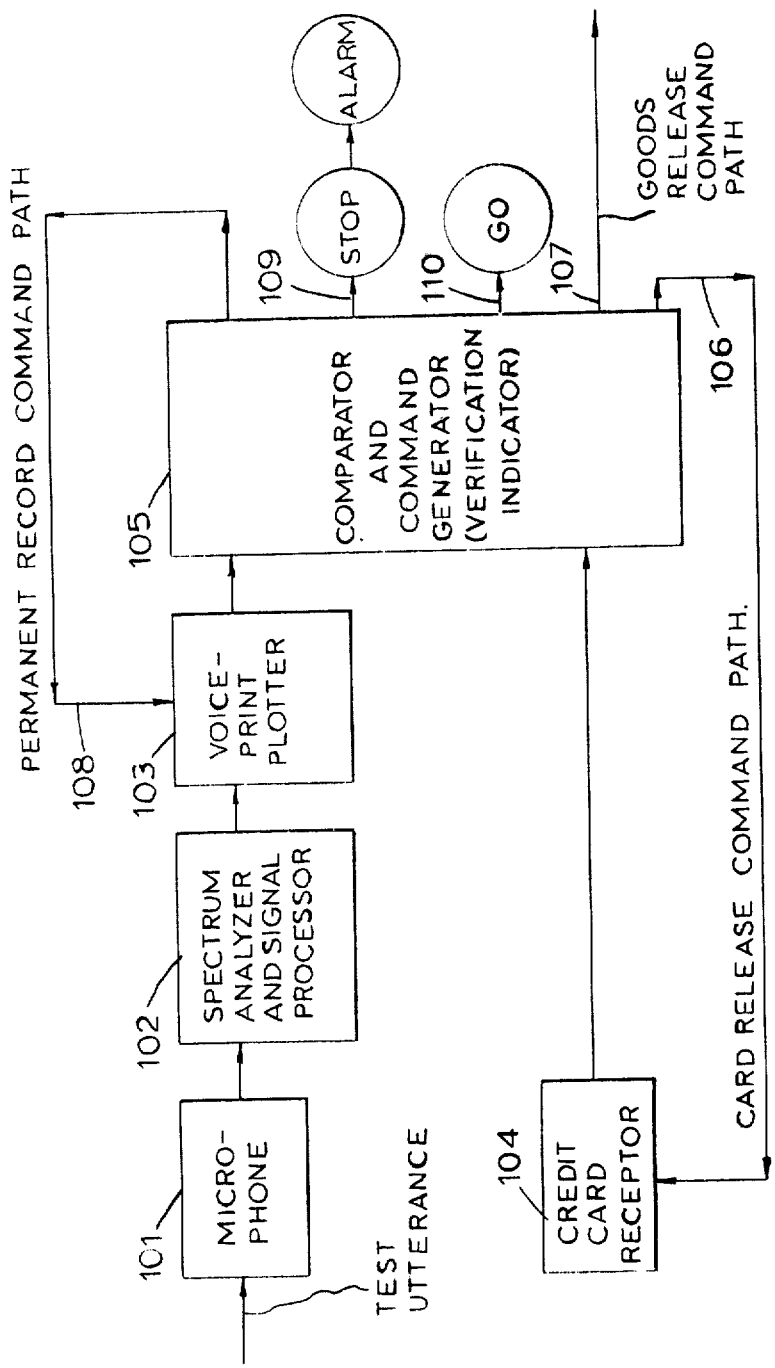

FIG. 9 is a schematic representation of voiceprint comparing equipment and system for credit card verification.

Figure 10:
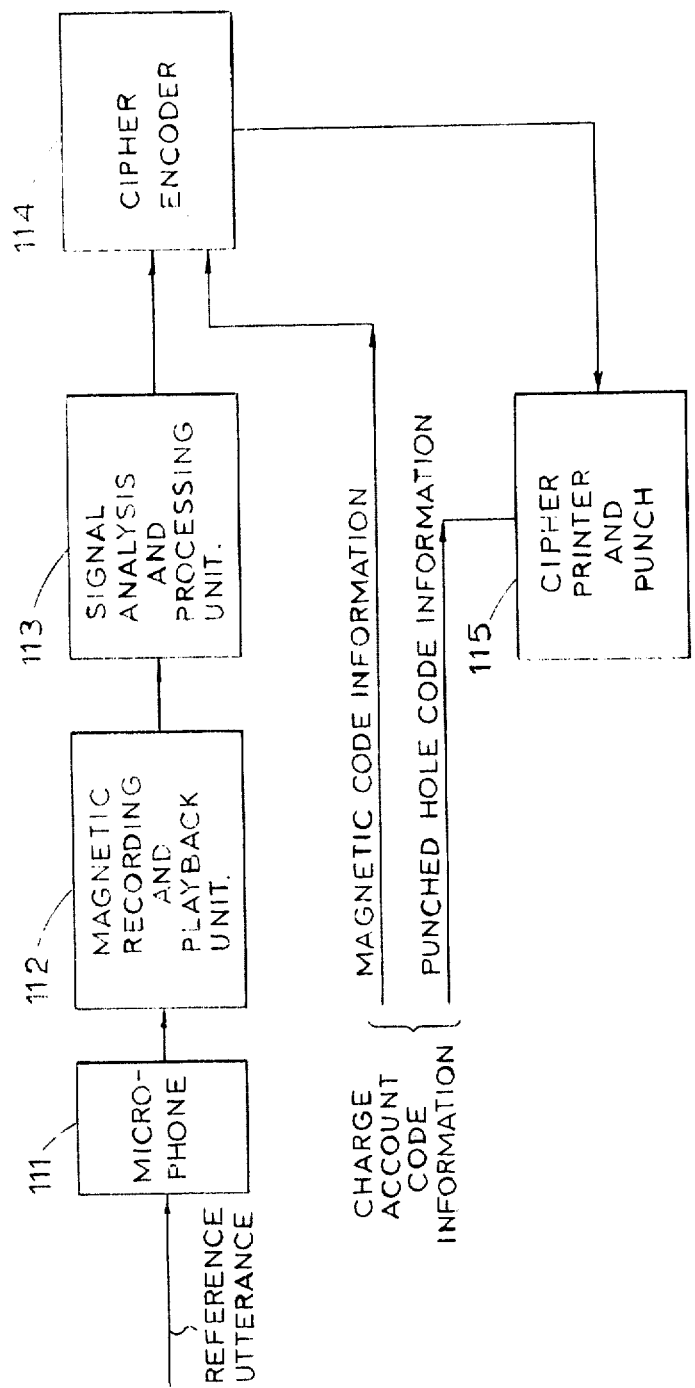
Figure 11:
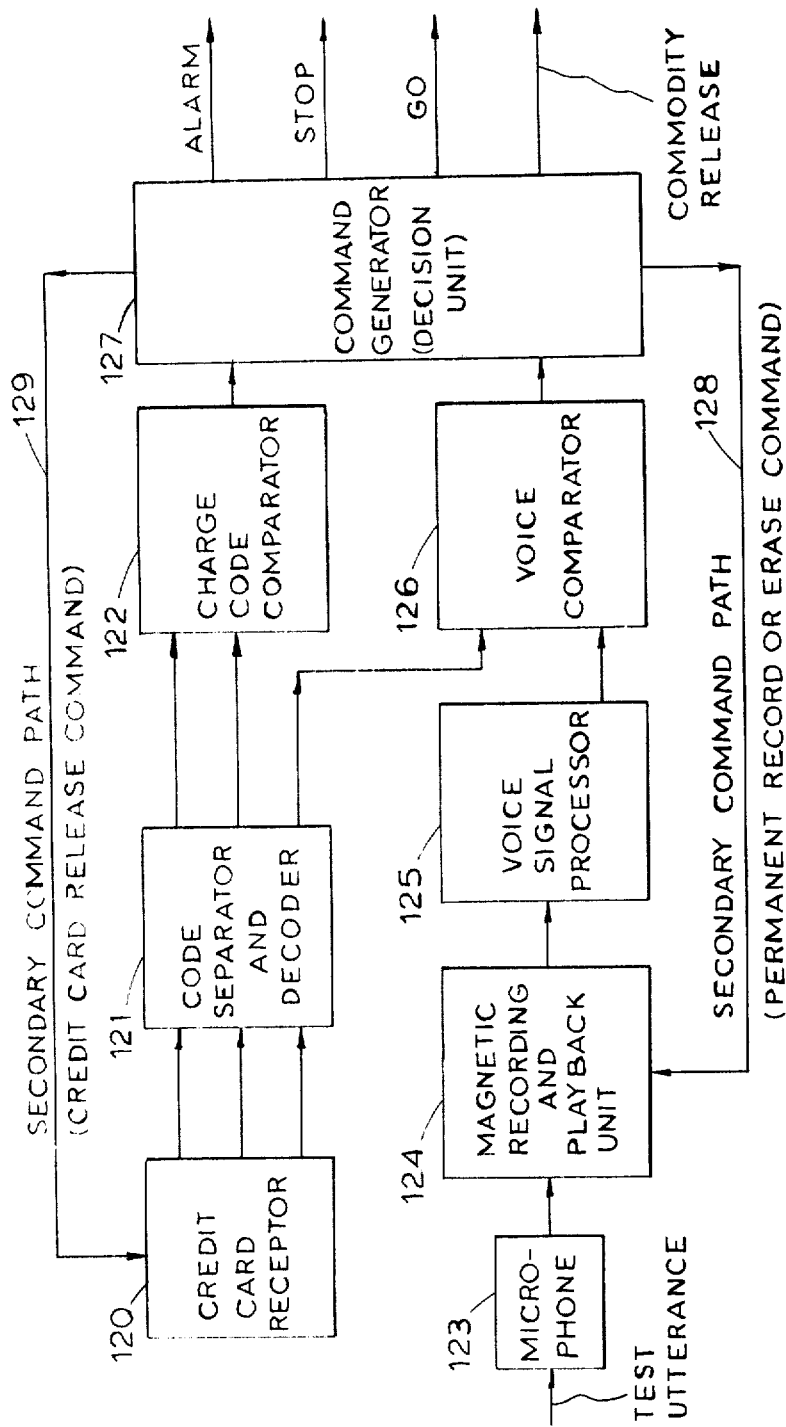

FIG. 10 is a schematic representation of equipment and method for preparing a special credit card;

FIG. 11 is a schematic representation of verification equipment and method;

FIG. 12 is a schematic representation of simplified equipment for preparing a special credit card; and FIG. 13 is a schematic representation of simplified verification equipment and method.

Figure 1:
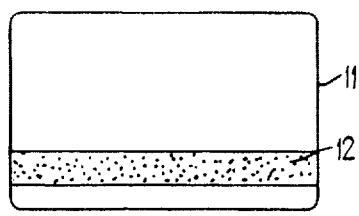
FIG. 1 illustrates a credit card which is of known type except that it bears a strip of magnetic recording material on which, though of course, this cannot be illustrated, there is recorded a voiceprint of the authorised holder of the card.

The credit card illustrated in FIG. 1 and indicated generally by reference numeral 11 is of the well-known kind, and may have printed or otherwise recorded thereon all the information concerning the issuing company, the authorised holder, and the credit limit to which use of the card is subject, which such cards customarily bear. Additionally, however, the card 11 is provided on one of its faces with a strip 12 of magnetic recording material on which is recorded a voiceprint of the authorised holder. The voiceprint may be recorded on the strip 12 directly as a sound recording of the voice of the authorised holder as he speaks, say, his name; or, equally satisfactorily, the voiceprint may be in the form of a magnetic record of a signal pulse train which constitutes a coded speech analysis of the speaking voice of the authorised holder as produced by means of a speech analyser prior to being recorded on the strip 12.

Figure 2:
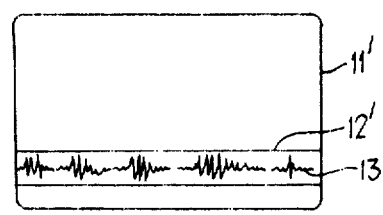
FIG. 2 illustrates a credit card which is similar to that shown in FIG. 1 except that, instead of a magnetic recording of the voiceprint of the authorised holder, it carries a visible representation of such a voiceprint.

The credit card illustrated in FIG. 2, and indicated generally by a reference 11', is also of the well-known kind except that it is provided with a region 12' on which is visibly printed a trace 13 which is a visible record of a voiceprint of the authorised holder of the card. As in the case of FIG. 1, the card 11' of FIG. 2 may alternatively have visibly recorded thereon not a voiceprint trace 13 as illustrated but a visible representation of spaced pulses constituting a coded speech analysis of the authorised holder of the card.

It will be understood that the cards 11 and 11' each uniquely identify the authorised holder by means of the voiceprint data recorded when the cards are presented to suitable apparatus for reading these data.

Figure 3:
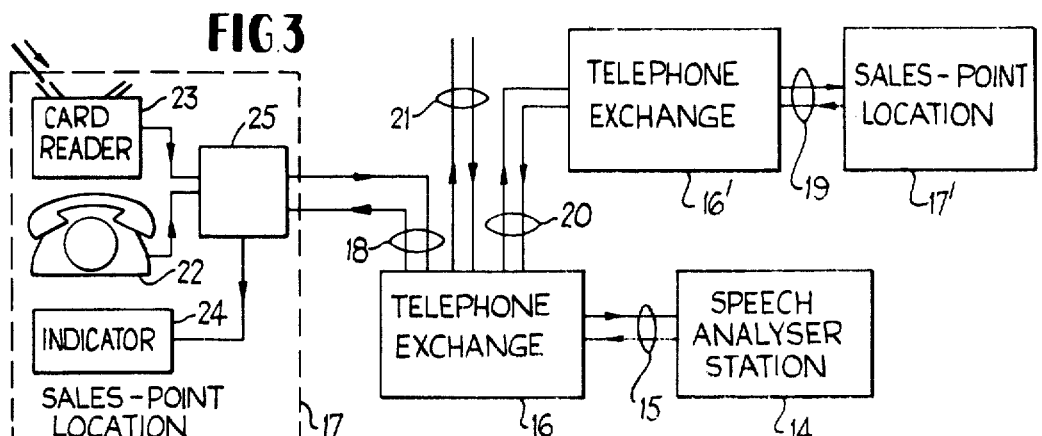
FIG. 3 is a schematic diagram of a credit card utilisation system with which a credit card as shown in FIG. 1 or FIG. 2 may be used.

FIG. 3 shows a first, basic, security card utilisation system with which credit cards or other security cards like the card 11 may be used. The system illustrated in FIG. 3 comprises a speech analyser station 14 connected via a public telephone line 15 to its local telephone exchange 16. The station 14 is accessible via the public telephone system to each of a plurality of sales-point locations of which two are shown, indicated by references 17 and 17', respectively. The sales-point location 17 is assumed to be in the same locality as the speech analyser 14 and to be served by the same telephone exchange 16, to which it is therefore connected by its own telephone line 18. The sales point location 17', identical in form with the location 17 and therefore not shown or described in detail, is assumed to be served by a telephone exchange 16' to which it is connected by a telephone line 19, the telephone exchanges 16 and 16' being connected to one another as shown by a telephone line or other telecommunications link 20 or through intervening telephone exchanges (not shown). Further sales point locations (not shown) are connected, as by a further telephone line 21, to the exchange 16 and are thus each connectable to the speech analyser station 14.

Each sales-point location 17 or 17' and so on is one at which credit or other security cards like that shown in FIG. 1, for example, are recognised; and each is provided with a telephone 22, a card reader 23 and an indicator 24, all connectable through connection circuitry 25 to the telephone line 18, as is illustrated schematically in the case of the location 17. A card holder wishing to use his card at, say, the location 17 uses the utilisation system shown in FIG. 3 as follows. First, he uses the telephone 22 to call the number of the speech analyser station 14, and by this means puts the location 17 in connection with the station 14, through the exchange 16. If he were at location 17', the connection would be established through the exchanges 16' and 16. Having established the necessary connection, he speaks to the speech analyser station 14 which performs a speech analysis on the received speech. The card holder also presents his card 11 to the card reader 23, which is constructed to scan the strip 12 and to derive therefrom signals representing the data recorded thereon. These signals are also transmitted to the speech analyser. If the data are directly in the form of recorded speech, the speech analyser station 14 performs a speech analysis on the reproduced recorded speech as well, and compares the results of the two analyses in any convenient manner. If, on the other hand, the voiceprint is recorded on the card in the form of pulses constituting a coded speech analysis, the analyser station 14 provides a similarly coded analysis of the speech transmitted by the telephone 22 and then compares the two coded analyses. In either case, the analyser station makes the necessary comparison and then, dependent on the result being satisfactory, emits a signal which is transmitted back to the location 17 to actuate or to illuminate the indicator 24 so as to confirm that the person presenting the card is the person whose voiceprint is recorded thereon. The sales personnel at the sales point location 17 can then, with full confidence, permit the card holder to use his card to obtain credit.

It will be understood that, although the locations 17 and 17' have been referred to as sales point locations, this term is intended to include, for example, banks where the credit card holder will not be making a purchase but merely wishes to draw cash or to effect some other transaction which he can only be permitted to do after having identified himself. Equally, the system may be an internal telephone system of, for example, a security establishment or other organisation to which access is only permitted after proper identification. In that case, the telephone exchange 16 may be the internal exchange of the establishment (within which the speech analyser may be accommodated), and each entrance to the establishment, or to individual parts thereof, may be provided with an identity checkpoint (corresponding to the sales point location 17), at which persons presenting themselves present also not a credit card but a security card corresponding to the credit card as described above with reference to FIG. 1 or FIG. 2.

It is to be understood that, although in the system illustrated in FIG. 3, the speech analyser station 14 is remote from all the sales point locations and is used by all of them in common, it is within the scope of the invention to provide each sales point location with its own analyser, the link to which does not then involve the public telephone system but only a private internal telephone system or, even, a direct connection provided for the credit card utilisation system alone.

It will also be understood that the data recorded on the credit or other security card of FIG. 1 or FIG. 2 for uniquely identifying the authorised holder need not, even assuming that voiceprints are used for this purpose, be either a voiceprint itself or details of the analysis of the voiceprint. Instead, the data recorded on the card may be the access code to a specific location in a computerised memory store containing voiceprint records or analyses of all authorised card holders, the memory store being associated with the speech analyser station 14. When, as described above, the data from a card 11 or 11' are read by a card reader 23 and transmitted to the station 14, the transmitted signals call up the respective memory store location. The memory store then presents the appropriate voiceprint or its analysis for comparison with the analysis at the station 14 which is performed by the speech analyser on the voice of the card holder as transmitted by the telephone 22.

The systems described above with reference to FIG. 3 enable sales or security personnel at any of the locations 17 and so on to verify the identity of a card holder who is actually present at the respective location. Only minor modification or development of the system is required to enable a card holder to obtain credit or to establish his identity on the same reliable basis without being present in person at the sales point location, as, for example, when he wishes to order goods by telephone. However, it is preferred, when credit is to be obtainable remotely, to provide a more elaborate card utilisation system which not only serves to identify the card holder reliably but also gives him, in turn, the assurance that he will not be overcharged in respect of a purchase which he makes remotedly by use of his credit card.

Figure 4:
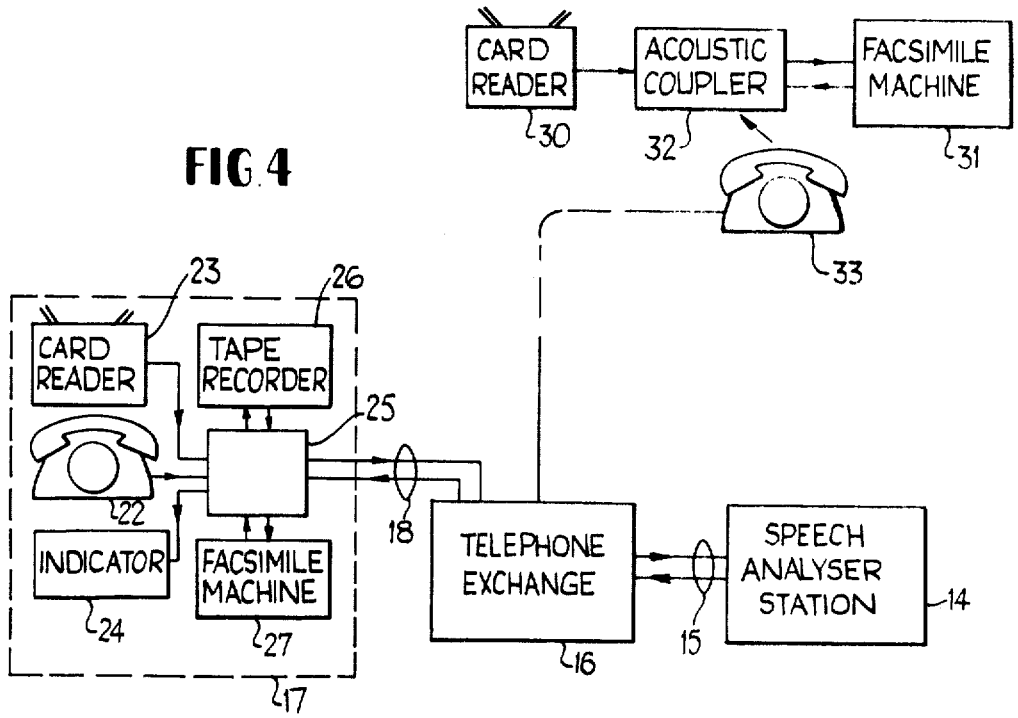
FIG. 4 is a schematic diagram of a more complex credit card utilisation system with which a credit card as shown in FIG. 1 or FIG. 2 may be used, in secure conditions, to transact business on credit between locations which are remote from one another.

A suitable system according to the invention is illustrated in FIG. 4. As in FIG. 3, it comprises a sales location point 17 furnished with a card reader 23 (for use in connection with card holders presenting themselves in person), a telephone 22 and an indicator 24, these all being connectable through connection circuitry 25 to the local telephone exchange 16 and therethrough to a speech analyser station 14 of the system. The location 17 of FIG. 4 is additionally furnished with a recording device 26 (which may be a suitable tape recorder), and with a document facsimile transmitter-receiver 27 of any known and suitable kind, thus being connected into the connection circuitry 25.

Each credit card holder who wishes to be able to use his credit card remotely is provided with a card reader 30 and with a facsimile transmitter/receiver 31 (which may be identical in construction with, respectively, the card reader 23 and facsimile transmitter/receiver 27 at each sales point location 17), and also with an acoustic coupler device 32, of known kind, to which the card reader 30 and facsimile machine 31 are connected and by means of which they may be coupled to the credit card holder's telephone 33 (or indeed to any telephone), and thus put in connection through an existing telephone system with any one of the sales point locations 17.

The facsimile machine may be of any suitable kind, for example as disclosed in British Pat. No. 1,169,912 of Xerox Corporation. Similarly, the acoustic coupler 31 may be of any suitable kind, including that disclosed in British Pat. No. 1,232,734 to the Magnavox Company.

To make and pay for a purchase from a remote sales point location 17, the card holder first uses his telephone 33 to make a call in the normal way to the appropriate sales point location 17. This enables him to hold a normal telephone conversation with a member of the sales personnel there, using the telephone 22. When a purchase has been agreed on, and the card holder advises that he wishes to use his card to make payment, the member of the sales personnel who has been contacted first ascertains the caller's telephone number and then switches the circuitry 25 to connect the recorder 26 in circuit. The card holder then uses his telephone 33 to provide a sample of his speech which is recorded in the recorder 26, and positions the handset of his telephone on the acoustic coupler 31 to connect his card reader 30 to the recorder 26. The card holder passes his credit card 11 through the card reader 30 and thus the data on the card are transmitted to the recorder 26 where they are recorded. The call originated by the card holder is then terminated, thus clearing the telephone line 18 connecting the sales point location 17 to its local telephone exchange 16, and enabling the sales point personnel to put through a normal telephone call to the speech analyser station 14. When this connection is established, the sales point personnel play back the recording on the recorder 26, thus presenting to the station 14 both the card holder's speech sample and the data recorded on his credit card. As already explained, these data may be for example an actual voiceprint, or a coded analysis of a voiceprint, or an access code which serves to retrieve either of these from a store bank associated with the station 14. Whichever of these possibilities is employed in the system, the signals transmitted to the station 14 enable the required comparison to be made there so that the station 14 transmits the appropriate signal to the indicator 24 at the location 17, indicating (if such is the case) that the card holder who made the original call is indeed the authorised holder of the card which he then presented to his card reader.

Having obtained this authentication, the involved member of the sales point personnel telephones the card holder's number, as previously ascertained, and thus re-establishes contact. He makes out the credit card company's slip for the sale in the normal manner, as though the card holder were there in person to sign it, and then presents the completed slip to the facsimile machine 27 for transmission to the card holder's facsimile machine 31. The necessary interconnection of the two machines is achieved by the card holder replacing his telephone handset on the acoustic coupler 31 and by the sales point personnel member setting his connecting circuitry 25 appropriately. Thus the machine 31 is caused to deliver to the card holder a facsimile of the slip which the sales point personnel member has completed. The card holder then immediately signs the facsimile he has received, and presents it (preferably with his credit card superimposed on a part of the slip left blank for the purpose) to the reader section of his machine 31, which causes the machine 27 at the sales point location 17 to produce a further facsimile, this time of the signed slip. This further facsimile, bearing a facsimile of the card holder's signature (and preferably also of his credit card) may then be attached to the original (but unsigned) slip which was first completed, and the two documents together may be presented in the usual way to the card-issuing company, as debit notes against the account of the card holder.

In the foregoing description, the credit card utilisation systems disclosed by way of example have, for simplicity, been described as making use of independently existing telephone services as the necessary telecommunications links of the system. It will be apparent, however, that the way in which these links are provided is not basic to the invention. Clearly, the use of available existing services is preferable on grounds of cost and convenience if these are adequate for the demands of the system, but a credit card utilisation system according to the invention may instead be entirely self-contained, utilising its own private telecommunications links entirely. These may be effected for example either by land lines or by short-wave radio or by a combination of these and possibly other means, not excluding long-distance linkages via earth satellite. If the linkages used in the system are of sufficiently high grade, it may be preferred to provide each sales point location with television camera and transmission facilities and to make television receiving facilities available, perhaps optionally, to credit card holders. Then, a card holder wishing to order goods from a remote location, as described with reference to FIG. 4, can be shown, over the television link, those goods which he may wish to purchase. If he wishes to take time to consider his choice, of course, it is also possible for permanent pictures of the various goods available to be transmitted to him using the facsimile machine 27 at the sales point location and his own facsimile machine 31.

An embodiment of a card utilisation system which includes television facilities is illustrated in FIG. 5. As shown, a sales point location 17 is provided with an integrally built telecommunication unit 35. The unit 35 comprises: a push-button telephone unit of which the hand-set is referenced 22a and the push-button unit 22b, with ten buttons for the digits 0 – 9; a card reader of which card entry and exit slots 23a and 23b are shown; a tape recorder 26; a television camera 36 with lens 36a; a loudspeaker 37; an indicator unit 24 corresponding to the indicator unit 24 in FIG. 4; manual controls 38; and internal connection circuitry (not shown) which connects all the aforementioned to a transmission channel or channels 39 linking the unit 35 into a telecommunications network 40 which may be any suitable existing or specially provided network and is not further described here. Thus, the unit 35 includes a television camera and, in addition, all the items of equipment of the station 17 of FIG. 4 except the facsimile machine 27 thereof. In the FIG. 5 embodiment, the facsimile machine 27 for the location 17 is provided as a separate unit, with its own integral acoustic coupler of which parts 27a and 27b are provided to receive the telephone handset 22a, thereby to couple the facsimile machine 27 into the circuitry of the unit 35.

Also linked to the network 40, by its own transmission channel or channels 41, is a card holder's station 42 provided with a unit 35' which may be, to a large degree, identical with the unit 35. the station 42 includes a telephone comprising a handset 33a and push button unit 33b; a card reader with a card entry and exit slots 30a and 30b; a television receiver with a screen 36b replacing the television camera 36 of the unit 35; a loudspeaker 37'; manual controls 38'; and a tape recorder 26'. As at the location 17, a facsimile machine 31 is provided separately, with an integral acoustic coupler of which parts 31a and 31b co-operate with the telephone handset 33a (which may be placed upon them as shown in broken line) to couple the facsimile machine 31 into the circuitry of the unit 35'.

Each of many card-holder's stations, like the illustrated station 42, has access at will, through the network 40, to each of many sales point locations like the illustrated location 17, and each of these sales point locations also has access through the network 40 to the speech analyser station 14 which may also, as already described, include a memory store from which voiceprints can be called up in response to signals read from card holder's cards.

With sophisticated apparatus as above described, available at the stations 42, the card holder who has access to them may use his station not only for ordinary telephone use and for credit-sale transactions as above described, but also to gain access to, and to receive information from, any information banks, such as a bank 43, and other services which may be accessible via the network 40. The illustrated bank 43 may, for example, be a computerised microfilm library with selection and read-out means, capable of supplying requested information in a form adapted for presentation either on the television screen 36' of the station 42 or on the facsimile machine 31 thereof. It will be understood that, with the fully integrated system described, payment for such information may be made by use of the card holder's credit card. Similarly, access may be had to any available computerised translation service and, again, payment may be made by use of the holder's credit card.

A particular case in which use may or may not be made of a separately existing telephone service is in connection with a pay television network. In that case, of course, each television receiver in the network is usually connected by private land-lines to the central programme transmitting station; and these land-line connections may provide the means by which credit transactions of the kind already described are made by way of payment for programmes to be supplied. Each subscriber may have a telephone and a card reader, like the telephone 33 and card reader 30 of FIG. 4, these being connected or connectable to the transmitting station over the land line which is provided for carrying the programmes to his television receiver. He may then order a desired programme, and provide a sample of his speech by telephone, and then transmit his voice print by presenting his credit card to his card reader. With the order for a programme thus authenticated, the desired programme may be switched to his receiver and charged against his credit. The credit card may, similarly, be used for payment for use of a dial-a-song service, or for gaining access to movie programmes.

The foregoing descriptions of particular instances of ways in which credit-card utilisation systems according to the invention may be used are, of course, given by way of example only. Particularly in the case of a sophisticated system which provides for television communication and the transmission of facsimile copies, the uses to which the system may be put are almost limitless. In particular, as illustrated by the above description of a process of making a remote purchase, the parties involved may, even though remote from one another, deal with one another in complete security and in the knowledge that each can be supplied with full authentication of the transaction involved. It will be apparent that this advantageous characteristic of the credit cards and card utilisation systems according to the invention makes them ideal for financial transactions such as the issue and acknowledgement of instructions to banks or brokers. The provision of facsimile transmission not only enables payment to be authenticated as above described but also, when the purchase involves issue of a ticket or other document for subsequent use by the purchaser (as, for example, theatre and airline tickets, or cheques guaranteed by the issuing bank), enables the purchaser to be supplied with such documents without delay. In principle, of course, the facsimile apparatus may provide copies either in black and white or in full colour; and the same is true of the above described television facility. The use of cards and systems according to the invention as means of establishing or authenticating personal identities has already been referred to, and provides another example of an application of the invention.

It will be understood that, although the television facility provided in the system shown in FIG. 5 is a one-way facility only, the system illustrated may be modified if desired to provide two-way television communicaton. Thus, the camera 36 of each unit 35 may be replaced by a television receiver like that of each of the units 35' and each unit 35 and 35' may be provided additionally with a television camera, either built-in or separate but electrically connected to the unit. The system then provides full two-way video-telephone facilities, in addition to the facilities already described.

If, as mentioned above, a card holder's station 42 includes a television camera facility, this can, of course, be used to transmit to any location 17, for presentation by the television receiver there on the screen thereof, a picture of the card holder and, simultaneously, of the card he holds. Particularly, in this case, the card may be one which bears a photograph of the authorised holder, thus providing an immediate visual check as an additional security measure.

It will be appreciated that each card holder's station 42 comprising the unit 35' and the facsimile machine 31, is conceived as a portable station which the card holder can carry with him. Each unit 35' may incorporate an acoustic coupler of its own, so that it may be easily connected to any convenient existing telephone. Equally, a unit 35' may incorporate or be connectable to its own radio transmitter-receiver so that it may be used from remote locations to which no wired telephone system extends. In that case, it is preferred that the unit 35' should include its own power generator, and this (in view of recent developments in the design and power capabilities of solar cells), may be constituted by a panel of solar cells disposed, for example, on the top surface of the unit 35'.

Finally, mention should be made of one further specific use of the card utilisation systems described in the foregoing, namely to enable telephone calls (including video-telephone calls if the system includes television facilities), to be paid for by means of the credit card. Thus, for example in the system shown in FIG. 4, the telephone exchange 16 may itself include a sales-point location 17 at which the telephone operator can obtain authentication of a card holder's identity and details of his account, as recorded with his voice-print on his card, so that the call which the card holder requires can be charged to the correct account with no possibility that the use of the card was fraudulent.

In the modification shown in FIg. 6, the unit 35' at the card holder's station 42 has linked to it a television camera 44 so as to provide for two-way television as referred to above (it being assumed that the camera 36 of the unit 35 in FIG. 5 is replaced by a television receiver and that the unit 35 is similarly provided with a separate but linked camera like the camera 44). Additionally, the unit 35' includes a built-in camera 36" for the purpose of scanning and transmitting a picture of a credit card inserted into the unit 35'. To that end, the unit 35' in FIG. 6 has a differently oriented path for the inserted credit card. As shown, the entry slot 30a is so oriented that the inserted card is presented face-on to the camera 36". The exit slot for the card is not shown because it is on the unseen end of the unit 35' which is opposite to the end on which the handset 33a is provided. With this arrangement, a picture of an inserted credit card 11 or 12, like that of FIG. 1 or 2 but also bearing a picture of the authorised holder as shown in FIG. 7, can be transmitted to any location 17 which has been called by means of the telephone 33a, 33b. The location 17 thus called may be, for example, a bank from which the calling card holder desires a guaranteed bank cheque for a specified amount. When the caller has called the bank and established his identity by means of his card, both visually and by means of the voiceprint record on it, the bank can issue the desired cheque by means of its facsimile machine, so that a facsimile guaranteed cheque 45 for the required amount is caused to issue, and thus be available for his use, from the card holder's facsimile machine 31 as shown.

It will be appreciated that the authorised holder of a credit card as described with reference to FIGS. 1, 2 or 7, may use it to have telephone calls charged to his own credit account whenever he makes a call from a telephone provided with means for reading the voiceprint and/or the picture on his card, whether this telephone is a public telephone or the telephone of a private subscriber.

FIGS. 8 and 8A show highly diagrammatically a card verification system embodying a card transport system.

A card which bears a magnetic recording of the authorised holder's voice is presented to the system at a card entry point and is transported at predetermined speed along a path which passes a magnetic cardreading head and thence to a discharge point at which the card is ejected. As the card passes the reading head or reading transducer, its magnetic track is scanned by the head which produces an output elelctrical signal or a group of electrical signals corresponding to the voiceprint. This signal is fed to a first magnetic recording head positioned in recording relationship with a first short closed loop of magnetic recording tape which is fed at constant speed past the recording head and on which, accordingly, the voiceprint is re-recorded.

The device further comprises a microphone or acoustical transducer connected to transmit a second group of electrical signals to a second magnetic recording head which is similarly associated with a second short closed loop of magnetic recording tape which is fed past it at constant speed, so as to record thereon a recording of the voice of a person speaking into the microphone. By this means, two recordings are obtained on the two closed loops of tape, and these two recordings can each be read repeatedly by respective ones of two tape-reading heads with which the device is provided, as the tape loops continue to be fed.

In this form the device is provided with a cathode ray system which is largely conventional in internal lay-out, the lay-out being similar to that of a conventional oscilloscope (see FIG. 8A). The system comprises two parallel arrays each involving a conventional electron fan followed by two pairs of opposed deflector plates. Two separate screens may be provided or, alternatively (as shown), a single screen on which the two traces are presented simultaneously along parallel axes for comparison therebetween. An output signal from each of the two tape-reading heads is fed for example to a corresponding pair of vertical deflector electrodes so as to provide two visible traces corresponding to the two recordings on the two tape loops.

It will be appreciated that the lengths and transport speeds of the tape loops may be such that the repetition frequency of the recordings thereon is synchronised with the scanning frequency of the oscilloscope traces; and even through this frequency will be low (of the order, say, of one per second), the oscilloscope(s) may be of the kind with a persistent-image screen such that this low frequency is adequate to provide steady images of the traces on the screen(s). Thus, the two voiceprints may be presented visually in close juxtaposition in which they can easily be compared visually. In this way, a person wishing to use his credit card and producing it to a sales assistant equipped with the above-described device, is enabled to establish by visible evidence that he is the authorised holder of the card. Additionally, or alternatively, the device may include electronic viewprint analyser means, to which are fed the signals from the microphone and from the card-reading head (either directly or from the above described first and second tape loops after they have been recorded thereon), and comparator circuits which will compare the two voiceprint analyses so obtained and will provide an indication that, as the case may be, the two voiceprints are, or are not, of the voice of one and the same person.

It will be understood that other forms of the device will be different in many detailed respects. In particular, the voiceprint recorded on the card may be recorded in any of several different forms, and the device according to the present invention must, naturally, be compatible. Thus, if the card carries a numerical record of a voice-print analysis, the device must contain means for making such an analysis and expressing it in numerical form for comparison.

The device may be so arranged that insertion of the card through a slot (not shown), into a position in which it then remains at rest, is effective to switch on the device, including a transport means which moves the card reading head over the stationary card so as to scan it at predetermined speed. This is the exact reverse of the arrangement illustrated in FIG. 8.

Referring now to FIG. 9 of the drawings, a conventional microphone 101 is shown coupled to a conventional spectrum analyser and signal processor 102. The unit 102 is coupled to a conventional voiceprint plotter 103 (of the contour line type as described in Ref 1, which is itself coupled to a conventional comparator and command generator 105. The unit 105 is designed to compare the contour-line type of voiceprints and to initiate command functions. Attached to the comparator 105 is a credit card receptor 104 which enables the comparator to "scan" the contour line type of voiceprint imprinted on the credit card. This scanning process is known to engineers versed in television tecnology as "flying spot scanning", a process which is readily adapted for comparison of visibly represented patterns such as contour line maps. The voiceprint used is a mapping of this kind, as described in Ref. 1. When the credit card holder wishes to prove his identity or authorised holdership of the card, he inserts the credit card into the card receptor. The card receptor holds the card in a suitable position for electronic scanning. It is designed to retain the card in this position until released by a release command sent by the comparator upon satisfactory completion of the verification process. The credit card holder now speaks into the microphone, uttering the test phrase.

Since the card holder wishes to have his authenticity verified, he will "co-operate" with the machine, pronouncing the appropriate test phrase clearly and using his normal speaking voice and speed. very reliable verification is thereby made possible, because the co-operative mode of operation permits the optimum decision thresholds to be set (see Ref. 2). In the basic form of the invention, the test phrase is converted to an electrical signal by the microphone and this electrical signal is fed into the spectrum analyser. The electrical signal is, of course, the electrical equivalent of the frequency and intensity patterns produced by the card holder's voice when speaking the test phrase. The spectrum analyser now extracts from this signal the significant measurements which, when fed to the voiceprint plotter, are translated into a contour line map representing the uniquely characteristic features of the test utterance, made by the credit card holder (see Ref. 1). The voiceprint so plotted in the form of a contour map may be displayed as a long-afterglow image on the face of a cathode ray oscilloscope (not shown). In this way, a means is provided for making a permanent record of the voiceprint by photographic means. An alarm signal set off by the comparator can be used, in turn, to trigger the photo-copy mechanism which makes a permanent record of the incoming voiceprint when the comparator 105 detects a fraudulent attempt. This can be of use for tracing and prosecuting an impostor who fraudulently tries to use someone else's credit card. The scanning and video signals which are generated for the visible display of a voiceprint on the face of a cathode ray tube can, of course, be used for direct electronic comparison of the video signals from the test utterance with the video signals from the flying spot scanner scanning the voiceprint on the credit card.

The comparator will operate at a suitable decision threshold, discriminating against differences between the reference voiceprint pattern on the credit card on the one hand and the test voiceprint pattern produced by the utterance spoken into the microphone on the other hand. If they match, the green 'GO' light is switched on, via the line 110, and a card release command signal is conveyed via the card release command path 106 to the credit card receptor 104, which then allows the credit card to be withdrawn. For use at an attended vending station, the green light authorises the attendant to accept the credit card. For an unattended vending station, the goods release command path 107 is activated.

It is one of the objectives of the present invention to provide effective protection against fraud in connection with credit card operated automatic vending stations. Automatic registration and validation of credit and debit procedures by means of magnetically encoded charge codes, and credit information borne on the credit card, and linked to a specialised computer which automatically verifies and advances customer credit, is a method for automatic vending which will be rendered increasingly attractive by the elimination of fraudulent use of the credit card. Such a credit card would, of course, be particularly vulnerable to fraud without voiceprint verification. Special safeguards are provided by the present invention. In the case of attempted fraud, the comparator detects the disparity between the test utterance and the referencce voiceprint on the credit card, and the red 'STOP' indicator-light is switched on via the line 109. Simultaneously, the alarm is sounded and the card release and goods release paths are blocked. The credit card is held inside the receptor and the goods are not released. In addition, a permanent record is made of the impostor's voiceprint in response to the Permanent Record Command Path being activated by the comparator. Any of a number of known methods can be used for obtaining the permanent record, such as the combination of long-afterglow cathode ray tubes with xerographic or photographic materials.

In practical applications, a variety of objectives have to be catered for and can be satisfied by the principles and methods of the present invention. When it is desirable to use a voiceprint credit card to carry information identifying the authorised card holder's credit account number, credit limit or credit balance, it can be an advantage to carry the voiceprint information in the form of a code or cipher other than a contour line voiceprint.

PREPARATION OF A SPECIAL CREDIT CARD

One preferred alternative is to encode the identifying characteristics of the card holder's voice in the form of a coded magnetic cipher. To improve the discrimination between impostor and authorised card holder, the voiceprint on the credit card is not merely produced by a single recording and transcription of a single utterance of the reference phrase, but by a multiple recording and reply process, so that the "most typical" of several utterances is selected for the voiceprint to be put on the credit card. The criteria for selection of such a "most typical" voiceprint are described in the literature (Ref. 2).

FIG. 10 of the accompanying drawings shows how the cipher or voiceprint is produced and imprinted. A microphone 111 is shown in conjunction with a conventional recording and reply unit 112 such as, for instance, a magnetic tape machine. The unit 112 is in turn coupled to a signal analysis and processing unit 113 (as described in the above-noted bibliographical References, 1, 2 and 3) in conjunction with a cipher encoder 114 which may take one of several conventional forms. The encoder 114 operates in conjunction with a cipher printer and punch 115 which, typically, may be a conventional magnetic recording head combined with a suitable conventional tape-transport or card transport mechanism and card punch (not shown).

The mcrophone is provided for the reception of the utterance of a reference phrase spoken by the authorised person. The microphone is linked directly or by telephone line or other suitable means to the recording equipment. The signal analysis and processing equipment is provided for the extraction of significant voice features from the utterance, played back by means of the playback part of the unit 112. In simpler versions, the recording unit 112 can be omitted, when the microphone 111 is directly connected to the signal analysis and processing unit 113. The signal analysis and processing unit 113, as described in the cited bibliographical references, is used for producing signals in coded form. In a preferred embodiment, the numerical form is used in a suitable conventional code, designed to represent the distinguishing features of the speaker's utterance of the test phrase. It will be understood that, in any practical representation of a set of characteristics, the maximum feature content that can be represented by means of a given cipher, whether this is a fingerprint, contour line, voiceprint, photograph or numerical code, is limited by the information storage capacity of the chosen medium. All the carriers mentioned provide ample capacity for most practical applications of card verification. Numerical codes are particularly suitable for use in conjunction with known automatic information processing, pattern recognition and feature comparison techniques, and should therefore be regarded as a preferred means.

The signal analysis and processing equipment 113 is arranged to produce its output in a coded form for transmission to the cipher encoder 114. These processing and selection routines can be understood by study of the cited references. The cipher encoder 114 specifically serves:

a. to combine the voiceprint signal with a charge code signal; and
b. to convert the processed signal into a suitable form for imprinting on the credit card.

The first of these purposes, namely, the combination of the voiceprint signal with the charge code, safeguards the credit card further against fraud. Supposing a credit card were strolen, and the thief "transplanted" a voiceprint from his own credit card onto the stolen credit card, he might then try to use the stolen card in certain circumstances. However, the present invention provides for a means whereby this fraud is prevented as follows. The voiceprint reference signal is combined with the charge code, and the combination is used for verification. Thus, the cipher fraudulently transferred to the stolen card would bear the impostor's charge code and therefore not gain admission to the original credit facility of the stolen card.

Credit cards normally contain a charge code in readable form, and this usually takes the shape of ordinary numerals. This code can therefore be utilised for use in corroborating the charge code integrity of the voiceprint verification cipher. In a preferred embodiment of this principle, the charge code is represented on the credit card in three forms:

a. in the normal legible form, using visible numerals;
b. in a code represented by punched holes in the credit card (or by a magnetic cipher); and
in a code embedded in, and combined with, the voiceprint cipher which the credit card bears.

The code (a) and, if desirable, the code (b) serve the normal charge code purposes. The codes (b) and (c) are used in combination to verify the integrity of the card, i.e. to ensure that fraudulent "transplants" of the voiceprint section are easily detected.

The punched holes are preferably situated within the area used for the readable charge code on the credit card. These and combined voice and charge code cipher are put onto the credit card by the cipher printer and punch 115. After recording of this cipher and punching of these holes, the card is ready for use. It is seen to contain three sets of information represented in numerical codes:

A. a magnetically encoded number representing the voiceprint;
B. a magnetically encoded number representing the charge code; and
C. a punched hole encoded number representing the charge code.

It will be remembered that the codes A and B are combined into a single magnetic cipher.

VERIFICATION EQUIPMENT AND METHOD

FIG. 11 is a schematic diagram of the equipment for verification of credit card holder identity, generally intended for use at the point of sale, or of card holder verification. A credit card receptor 120 is provided, containing conventional means for reading the punched hold charge code and the reading the magnetically encoded cipher, which is a combination of the voice cipher and the charge code cipher. The two readouts read off the credit card are represented by a first group of signals which are fed into the code separator, and there, conventional means are used for separating the first group of signals into first and second portions, wherein the first portion represents the voiceprint cipher and the second portion represents the charge code cipher. In other words, the conventional means separates the voiceprint cipher from the charge code cipher. The voiceprint cipher, the charge code cipher and the charge code information derived from the punched holes are then decoded by conventional means, i.e. processed by the Code Separator and Decoder 121. This renders them in suitable form for comparison by the comparators 122 and 126. Having inserted the card in the Credit Card Receptor 120, the credit card holder wishing to verify his authorised ownership of the card speaks the appropriate test utterance into the microphone or acoustical tranducer. The microphone or acoustical transducer generates a second group of electrical signals and is coupled to the magnetic recording and reply unit 124 and a recording is made of this utterance. The recording is, almost immediately, replayed to produce the input into the voice signal processor 125. This can be done without rewinding the tape by means of a read-out head situated "downstream" of the recording head. The voice signal processor extracts from the replayed recording of the test utterance those features which are characteristic for the identity of the speaker, and conveys these in a compatible code to the Voice Comparator 126. Equipments suitable for Voice Signal Processing of this kind, which extract the characteristic features of a test utterance and convert these into a numerical code, have been built by the Bell Telephone Laboratories, Sylvania Electric Product Inc., International Business Machines Corporation and other well-established companies as can be understood by reading the cited references. The code number corresponding to the characteristic properties of the test utterance is now compared in the Voice Comparator 126 with the code number corresponding to the voiceprint cipher on the credit card held in the credit card receptor, 120. Positive verification is given when the spoken voice corresponds to the voice-print cipher on the credit card. Also, the code number corresponding to the charge code in the form of the punched hole cipher is compared by the Charge Code Comparator 122 with the charge code in the magnetic cipher on the credit card. Positive verification is only given when the punched hole cipher corresponds to the charge code information embedded in the magnetic cipher. It is therefore not possible for an impostor to obtain positive verification with a stolen credit card by grafting the voiceprint cipher from his own credit card upon the stolen one, because the combination of the two magnetic codes, i.e. for voice and charge account, respectively, cannot readily be separated or separately transferred. The results of the code comparisons accomplished by means of the charge code comparator and voice comparator are communicated by suitable electrical signals to the command generator 127. If both decisions are positive, i.e. if both comparisons reveal identity, then commodity release is automatically enabled or authorised by illuminating a green light or activating another suitable verification indicator. Secondary command paths 128 and 129 are also shown in FIG. 11, which connect the Command Generator 127 with the Magnetic Recording and Replay Equipment 124 and the credit card receptor 120, allowing release of the credit card and erasure of the recording.

If one or other of the comparisons indicates incompatibility either between the vocal test utterance and the voice reference cipher on the card, or between the punched and the magnetic cipher for charge account information then the verification decision is negative and the command generator initiates an alarm signal and bars the commodity release function. Via the secondary command path 129, the generator 127 also bars the card release mechanism, thereby impounding the credit card inside the credit card receptor 120. Via the secondary command path 128, the generator 127 also bars the erase mechanism in the magnetic recording and playback unit 124 so that a permanent record of the impostor's voice is retained to aid capture, identification and prosecution of the impostor.

A SIMPLIFIED SYSTEM

A simplified version of the system is shown in FIGS. 12 and 13. This simple system provides most of the advantages of the complete system, but offers a substantially reduced cost and reduced complexity. This can be understood by the following considerations:

A. Athough the presentation of the charge account information in both punched hole and magnetic cipher provides very considerable added safeguards, appreciable protection is provided by a purposeful combination of the charge code and voiceprint information in the magnetic cipher alone.

B. Although the pre-recording of the test utterance to be verified offers certain operational advantages and both a useful means of deterrent and an aid to capture, it is not essential to the basic verification process.

FIG. 12 shows a microphone 130 connected to a signal processor 131, connected to a cipher encoder 132, itself connected to a cipher recorder 133. The authorised card holder speaks a reference utterance into the microphone 130 which is suitable processed in the signal processor 131. The significant voice characteristics are encoded in numerical form in the encoder 132 as is also the charge account information, and passed in the form of suitable electrical signals to the magnetic cipher recorder which imprints the combined magnetic cipher onto the credit card. The use of a credit card prepared in this way is in connection with credit card verification equipment which is illustrated in FIG. 13.

At the point of verification, the credit card is inserted into a credit card receptor 134 which is equipped with conventional magnetic read-out facilities. The code number represented by the magnetic cipher on the credit card is read out by these facilities. This read-out is fed into the code separator 135 which separates the charge code from the voice code and feeds the appropriate numerical information into the charge code display 136. This numerical informatioin relates to the charge account portion of the magnetic cipher and causes the charge account number of the credit card holder to be displayed. The code separator also feeds another appropriate numerical signal into the voice comparator 139.

The credit card holder who has placed the card in the receptor utters the test phrase into the microphone 137 and the voice signal processor 138 extracts from this utterance the characteristic features, representing them by a numerical code is compatible with that on the credit card. The voice comparator 139 receives the two numerical signals from the voice signal processor 138 and the code separator 135, respectively, and compares these. If identity is revealed, the command generator 140 activates the 'GO' signal and the credit card is released. If disparity is revealed, the stop and alarm functions are initiated as before. The sales attendant is therefore given proof or disproof of identity by the voiceprint verification process and can combine this with proof or disproof of credit card integrity by comparing the displayed charge account number with that read from the conventional numerals imprinted on the credit card.

It is to be noted that voiceprint extraction and comparison units such as Speech Inputs, Spectrum Analyzers, Segmentation Equipment, Feature Extractors, Recognizers, Comparators and Verification Indiciators are available commercially, for example, from the Voiceprint Laboratories Corporation of Somerville, N. J. U.S.A.

Instead of using data relating to the voice characteristics of the authorised holder it is possible instead to use coded data arbitrarily chosen to represent the authorised holder. Thus, for example, the data might represent a number. In this case, in order to use the card it would be necessary for the holder to identify that which the data represented, in the above example by speaking the number represented by the data, and the number spoken would then be compared with the number actually represented by the data on the card as read by suitable transducer means. An alternative is a musical sequence. The recorded data need not be in the audio range and may be for example a message represented by a series of emissions with ultra-sonic frequencies. In general, the recorded message may be any preset pattern of transmittable vibrations which are recorded on the card in a form readable by suitable transducer means.

The security card may have additionally to the data corresponding to the voice characteristics of the holder a so-called facial print consisting for example of the highlighted features of a photographic image of the holder's face.

Alternatively, the security card may also carry the holder's finger print.

BIBLIOGRAPHICAL REFERENCES

Ref. 1. L. G. Kersta — "Voiceprint Identification" — Nature, No. 4861 (Dec. 29th, 1962), pp. 1253 – 1257.

Ref. 2. James E. Luck — "Automatic Speaker Verification Using Cepstral Measurements" — Journal Acoust. Soceity America, Volume 46, Number 4, Part 2 (1969), pp. 1026 –1032.

Ref. 3. Sandra Pruzansky — "Pattern Matching Procedure For Automatic Talker Recognition" — Journal Acoust. Society America, Volume 35, Number 3, (1963), pp 354 – 358.

Ref. 4. K. P. Li, J. E. Dammann and W. D. Chapman — "Experimental Studies in Speaker Verification, Using an Adaptive System" — Journal of the Acoustical Society of America, vol 40, No. 5 (1966), pp. 966 – 978.

I claim:

1. A security card utilization system comprising:
a plurality of security cards, each having data recorded thereon relating to the voice characteristics of a respective authorized card holder;
at least one reading transducer adapted to read said data of any one of said cards presented thereto and to produce a first group of electrical signals which contain said data;
a first recording means comprising a first magnetic tape loop and a first recording head operative to receive and record said first group of electrical signals on said first tape loop;
at least one acoustical transducer responsive to the voice of any person and operative to produce a second group of electrical signals representative of the voice of such person;
a second recording means comprising a second magnetic tape loop and a second recording head operative to receive and record said second group of electrical signals on said second tape loop;
first and second pickup means operative to read said first and second tape loops respectively and produce first and second output signals therefrom; and
at least one comparator connected to said first pickup means and to said second pickup means to receive said first and said second groups of output signals therefrom and operative to effect a comparison thereof to indicate whether or not said person is the authorized holder of said one card.

2. A security card utilization system as claimed in claim 1 wherein said at least one comparator comprises an oscilloscope adapted to produce two traces, each corresponding to a respective one of said output signals.

3. A security card utilization system comprising:
a plurality of security cards, each having data recorded thereon relating to the voice characteristics of a respective authorized card holder;
at least one reading transducer adapted to read said data of any one of said cards presented thereto and to produce a first group of electrical signals which contain said data;
a security card receptor for receiving said one card to permit reading thereof by said reading transducer and for retaining said one card at least while said one card is being read by said reading transducer;
at least one acoustical transducer responsive to the voice of any person and operative to produce a second group of electrical signals representative of the voice of such person; and
at least one comparator connected to said reading and acoustical transducers to receive said first and second groups of electrical signals therefrom and to effect a comparison thereof and to produce a card release signal if, and only if, said comparison indicates said person is the authorized holder of said one card, said card release signal being operative to permit said card receptor to release said card.

4. A system as claimed in claim 3 wherein said comparator is operative in the event that said comparison indicates said person is not the authorized holder of said one card to produce an alarm signal.

5. A system as claimed in claim 4 further comprising recording means for making a permanent record of said data, said recording means actuated by said alarm signal.

6. A security card utilization system comprising:
a plurality of security cards, each having data recorded thereon relating to the voice characteristics of a respective authorized card holder and data representing a code assigned to said holder, the voice characteristics data and the code data being combined in a single composite code;
at least one reading transducer adapted to read said composite code of any one of said cards presented thereto and to produce a first group of electrical signals representing said composite code;
separator means for separating said first group of electrical signals into a first portion representing said voice characteristics and a second portion representing said assigned code;

at least one acoustical transducer responsive to the voice of any person and operative to produce a second group of electrical signals representative of the voice of such person; and at least one comparator connected to the reading transducer and to the separator means to receive said first portion of said first group of electrical signals and said second group of electrical signals therefrom and operative to effect a comparison thereof and thereby to provide an indication, on the basis of said comparison, whether or not said person is the authorized holder of said one card.

7. A system as claimed in claim 6, wherein the security cards each additionally bear further data representing said assigned code, said further data being uncombined with said voice characteristics data, and wherein the system additionally comprises reading means for reading said further data, and producing a further signal representing said further data, and a second comparator connected to receive said further signal and said second portion of said first group of electrical signals and effect a comparison thereof.

8. A system as claimed in claim 7 further comprising a decision unit connected to said first and second comparators and operative to produce a verification signal if and only if the first comparator indicates that said voice is the voice of the authorized holder and said second comparator indicates that the assigned codes as represented by the said further data and by the said second portion of said first group of electrical signals are identical to one another.

9. A system as claimed in claim 8 wherein said decision unit is operative in response to said first comparator indicating said voice is not the voice of the authorized holder of the card/or that said assigned codes are not identical to produce an alarm signal.

10. A system as claimed in claim 9 further comprising recording means for making a record of the voice of said person, and erasing means for erasing the record of said voice, said erasive means being rendered inoperative by the said alarm signal.

11. A system as claimed in claim 9 further comprising means for impounding the security card, said impounding means being actuated by said alarm signal.

12. A security card having recorded thereon data relating to the voice characteristics of an authorized holder and data representing a code assigned to said holder, the voice characteristics data and the code data being combined in a single composite code which is in a form readable by suitable transducer means.

13. A security card as claimed in claim 12 wherein said composite code is a numerical code.

14. A security card as claimed in claim 13 wherein said composite code is magnetically recorded.

15. A security card as claimed in claim 12 additionally bearing further data representing said code assigned to said holder, said further data being uncombined with said voice characteristics data.

16. A security card having recorded thereon first data relating to the voice characteristics of an authorized holder, second data representing a code assigned to said holder, said first and second data being combined in a single magnetically coded composite numerical code readable by suitable transducer means, and third data representing said assigned code, said third data being represented in the form of punched holes in the card.

* * * * *